(12) United States Patent
Maxwell (10) Patent No.: US 11,066,240 B1
(45) Date of Patent: Jul. 20, 2021

(54) AUTOMATED PHARMACY SYSTEM

(71) Applicant: Rodney H Maxwell, Aurora, TX (US)

(72) Inventor: Rodney H Maxwell, Aurora, TX (US)

(*) Notice: Subject to any disclaimer, the term of this patent is extended or adjusted under 35 U.S.C. 154(b) by 0 days.

(21) Appl. No.: 15/818,040

(22) Filed: Nov. 20, 2017

Related U.S. Application Data

(63) Continuation of application No. 15/165,857, filed on May 26, 2016, now abandoned.

(51) Int. Cl.
*B65G 1/137* (2006.01)
*B65G 1/04* (2006.01)

(52) U.S. Cl.
CPC ............. *B65G 1/1371* (2013.01); *B65G 1/04* (2013.01); *B65G 2203/0216* (2013.01)

(58) Field of Classification Search
CPC .......... B07C 3/10; B65G 1/1371; B65G 1/04; B65G 2203/0216
See application file for complete search history.

(56) References Cited

U.S. PATENT DOCUMENTS

| | | | | |
|---|---|---|---|---|
| 5,971,593 A * | 10/1999 | McGrady | ................ | G07F 9/026 221/13 |
| 2005/0171813 A1* | 8/2005 | Jordan | ................... | G06Q 50/22 705/2 |
| 2006/0259195 A1* | 11/2006 | Eliuk | ....................... | A61J 1/20 700/245 |

* cited by examiner

Primary Examiner — Saul Rodriguez
Assistant Examiner — Willie Berry, Jr.
(74) *Attorney, Agent, or Firm* — Leavitt Eldredge Law Firm (57) ABSTRACT

An automated pharmacy system includes a storage rack; bins to be stored within the storage rack and to store one or more medication packages, each of the bins having a separate bar code; a kiosk having an interface manually manipulated by a user to receive identifying information of the user; a central computer in data communication with the kiosk; a locker unit having lockers, the lockers having an identification reader to unlock the lockers based on receiving correct identifying information and lockers having a bar code; a robotic arm manipulated by the central computer; a rail positioned on a ground surface; and a bar code reader secured to the robotic arm.

1 Claim, 8 Drawing Sheets

AUTOMATED PHARMACY SYSTEM

BACKGROUND

1. Field of the Invention

The present invention relates generally to an automated pharmacy system, and more specifically, to a pharmaceutical point-of-sale kiosk, robotic pick and place system, and supervisory control and monitoring system.

2. Description of Related Art

Figure 1:
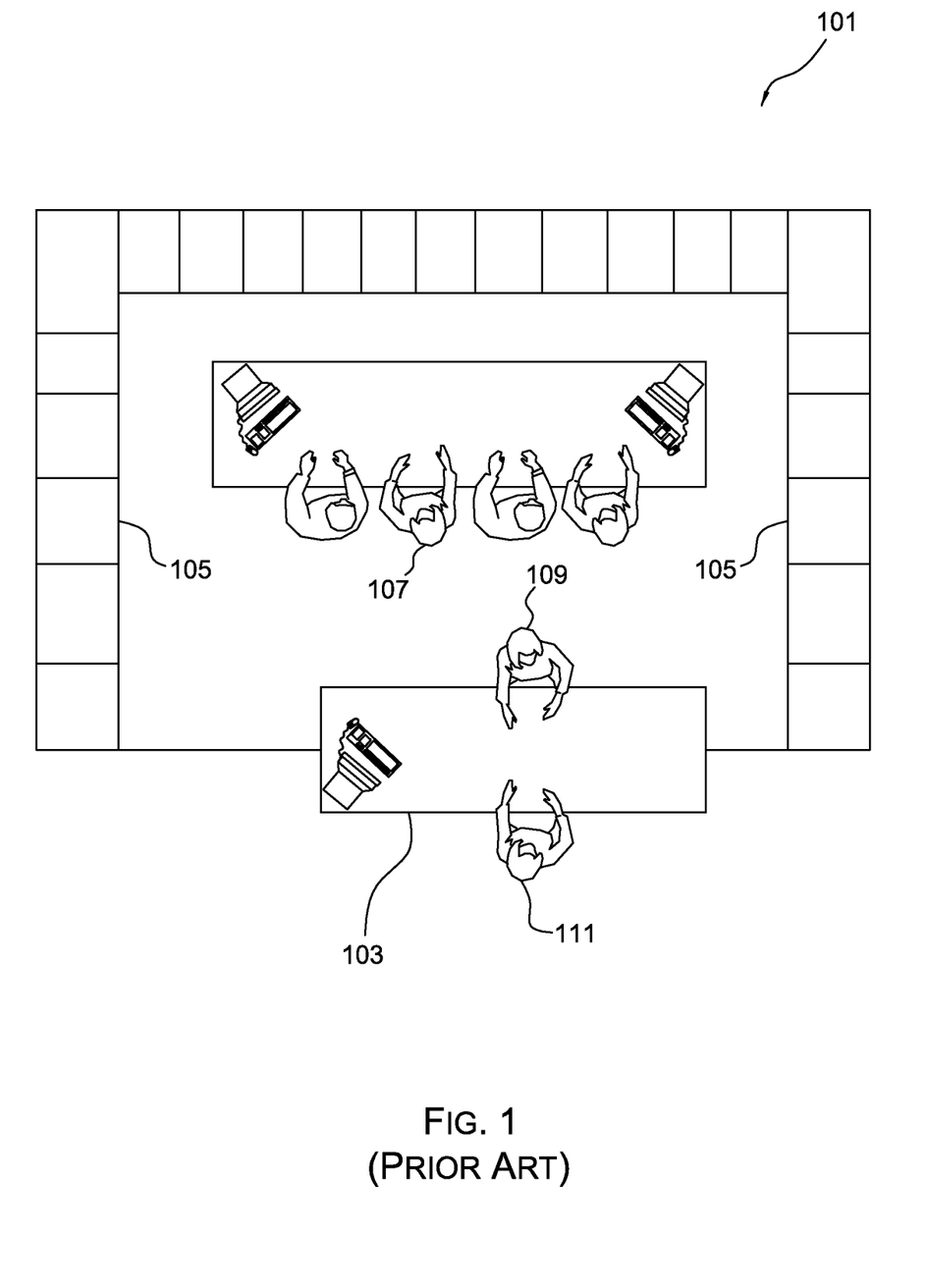
FIG. 1 is a top view of a conventional pharmacy system.

Pharmacies are a well known in the art and are an effective means of providing prescription drugs to individuals. In FIG. 1, a commonly known pharmacy system 101 is shown. The pharmacy system 101 includes one or more pharmacists 107 which prepare vials of prescription drugs in a secured area. The prepared vials are labeled with dosage information, placed in packages, and then stored in storage racks 105. One or more pharmacy technicians 109 are located at the customer service counter 103 to assist the customer 111.

As shown in FIG. 1, the conventional pharmacy system 101 is a laborious process with high overhead costs. Also the conventional system 101 is error prone due to the high human interaction throughout the process. A common error could lead to a customer getting the wrong medication which can have detrimental results. Additionally, conventional pharmacies can commonly have long wait times due to the laborious process and high demand; especially during the cold season. Therefore, sick individuals are left waiting, sometimes for hours or days, to get their prescribed medication. These are viewed as disadvantages of conventional pharmacy systems.

Although great strides have been made in the area of pharmacy systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional pharmacy systems. Specifically, the system of the present application provides an automated means of supplying pharmaceutical medications through the use of a robotic delivery system, smart bin storage system, central control system, and sophisticated user interface (kiosk). These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
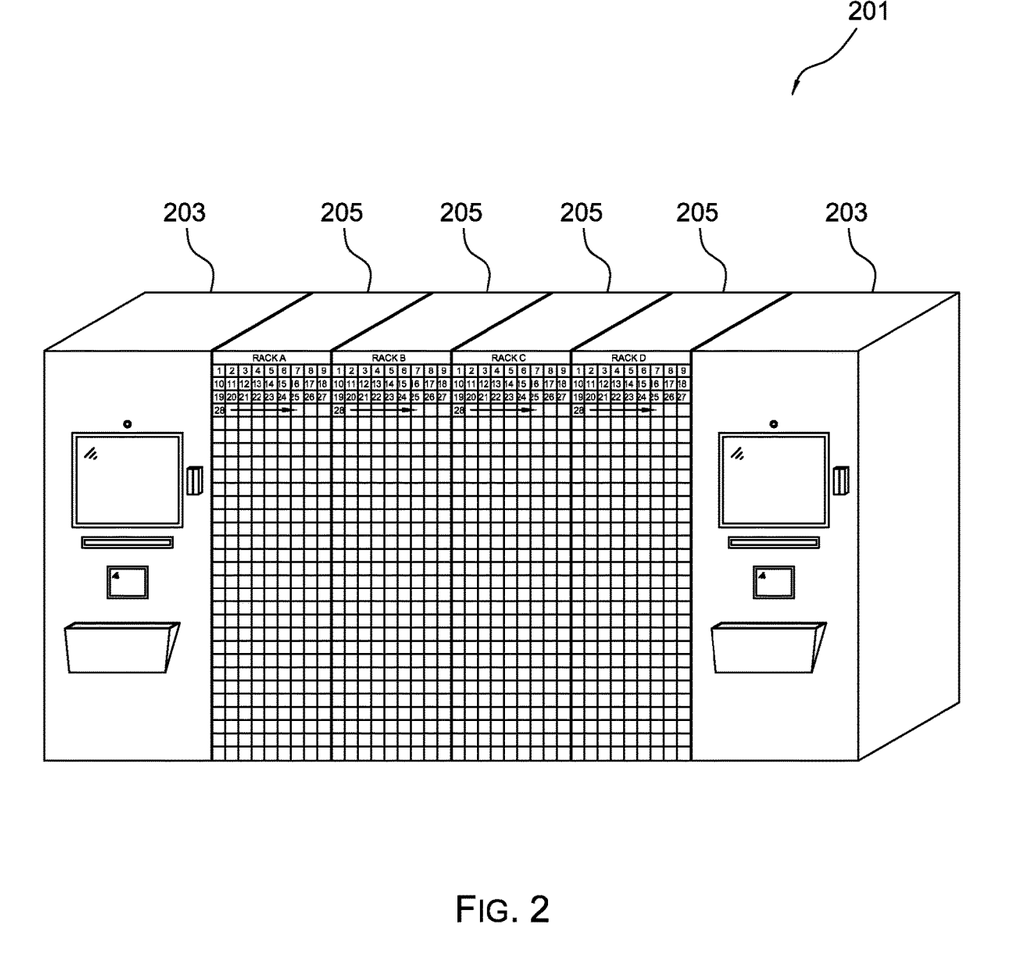
FIG. 2 is an oblique view in accordance with a preferred embodiment of the present application.

Referring now to the drawings wherein like reference characters identify corresponding or similar elements throughout the several views, FIG. 2 depicts an automated pharmacy system in accordance with a preferred embodiment of the present application. It will be appreciated that the automated pharmacy system 201 overcomes one or more of the above-listed problems commonly associated with conventional pharmacy systems.

In a preferred embodiment, system 201 includes one or more user interface device 203 in conjunction with one or more medication storage racks 205. The user interface device 203 is comprised of several components which will be described in detail below. The user interface device 203, or kiosk, provides a means for the customer to communicate with the automated pharmacy system 201 during the transaction. The storage racks 205 are made up of a plurality of compartmentalized shelves containing storage bins. The storage racks 205 contain a closed front such that the access opening is positioned away from the customer in a secured location. The plurality of storage bins which are located in the storage rack's 205 compartments act as a portable container for holding the pre-prepared medication packages.

Figure 3:
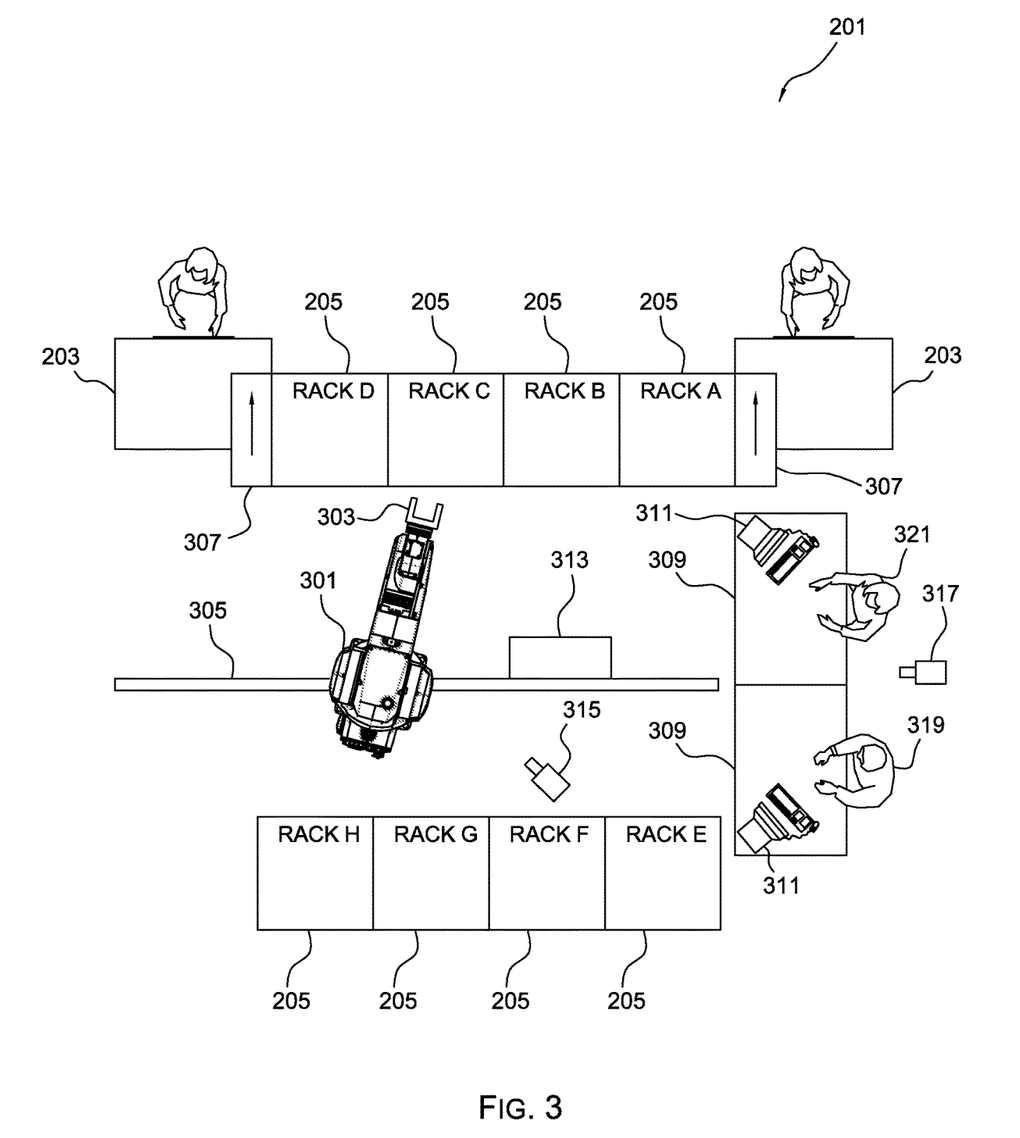
FIG. 3 is a top view of the automated pharmacy system of FIG. 2.

In FIG. 3, a top view of system 201 is given which shows the preferred layout of the system of the present application. One or more articulated arm robot systems 301 are traversed by a linear actuator system 305. The robot systems 301 each contain a gripping end effector; e.g. end of arm tool (EOAT), 303 which provides a means for the robot 305 to pick and place the bins located in storage racks 205. The multiple degrees of freedom of the robot arm combined with the linear movement from the linear actuator provide a full range of motion for automated bin handling on both sides of the linear actuator. This is viewed as one of the advantages of the system of the present application.

It is contemplated that an RFID reader and can also be included on each EOAT which supports a miniature camera. For an extra layer of security, the RFID reader can scan RFID labels which are applied to each bin to validate that the robot is at the correct bin location. Each Bin could contain one RFID label whose information is permanently stored in the database.

One or more user interface system delivery chutes 307 are shown in FIG. 3. The delivery chutes 307 are positioned behind the user interface device 203 and contain a guided, angled dispensing channel for package delivery. System 201 preferably includes one or more pharmacists 319 and pharmacy technicians 321. The pharmacists 319 prepare the medication packages at one or more work stations 309 which each contain computer systems 311. The computer systems 311 provide a means for the pharmacists 319 and pharmacy technicians 321 to communicate with the automated pharmacy system 201 through the central control system and system server 313. The system network and interconnection will be discussed in further detail below.

A pharmacist's camera system 317 is also depicted in FIG. 3. The pharmacist's camera system provides a means for the pharmacists to visually communicate with customer located at the user interface device 203 via the touch screen monitor. A robot camera system 315 is included in system 201 to visually monitor the robot motion during the transaction. Therefore, the customer can see the robot pick up the bin containing their package located in storage rack 205 and dump their sealed package in the delivery chute 307 via the touch screen monitor located on the user interface device 203. The robot camera system 315 also provides maintenance and troubleshooting provisions via offsite, visual path obstruction monitoring.

Figure 4:
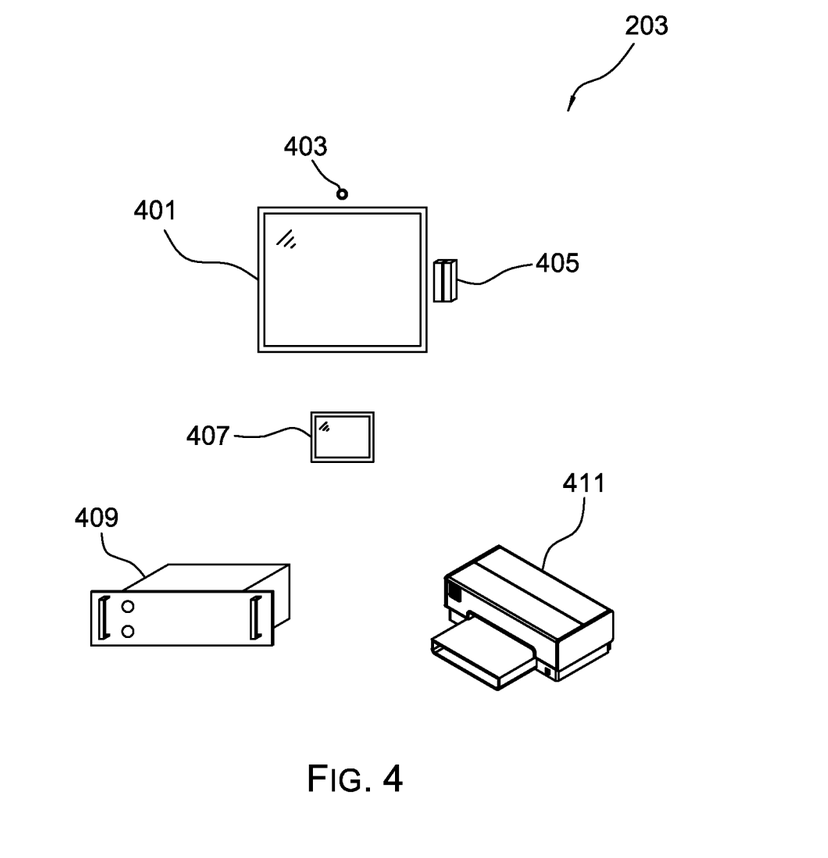
FIG. 4 is a partial view of the kiosk components of FIG. 2.

Referring now to FIG. 4, a partial view of the user interface device 203 is given which includes several key components. As shown, device 203 includes a touch screen monitor 401 (mentioned above) which provides the user with a means of communicating with the automated pharmacy system 201. Graphical visualization software will be used to electronically and automatically walk the user through the ordering process. A user interface camera 403 is integrated into the user interface device 203 to provide a means for the pharmacists to see the user. Additionally, the camera could be used for facial recognition and identity security.

A card reader system 405 is included in device 203 as depicted in FIG. 4. The card reader will provide a means for the customer to pay for the order using a payment card, e.g. credit, debit, gift card, etc. Other components included in device 203 are as follows: a barcode scanner 407, a computer system 409, and a printer 411. It is contemplated that additional components could be added to the user interface device 203 such as biometric identity scanners, currency accepters, currency dispensers, document scanners, privacy and security components such as sensor mats or screen guards, wireless components such as broadband, battery backup components such as uninterruptible power supply (UPS).

Figure 5:
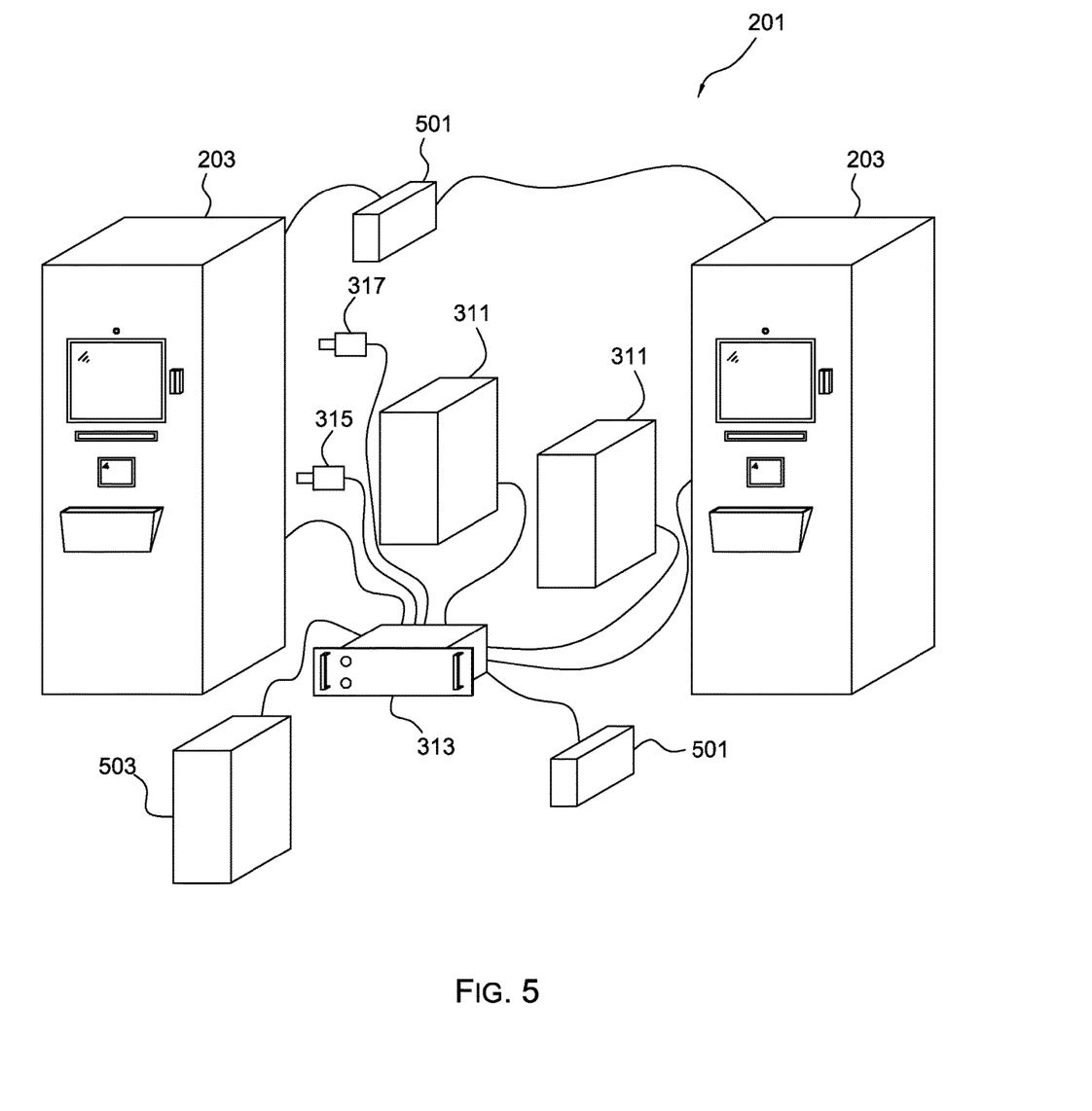
FIG. 5 is an oblique view of the automated pharmacy system of FIG. 2.

Referring now to FIG. 5, an oblique view of the automated pharmacy system 201 is given. As depicted in FIG. 5, system 201 includes a central controller 313 which contains an internal network. The central controller 313 supervises and monitors all processes included in the automated pharmacy system 201 and provides the electrical control communication to each system. Therefore, the components of system 201 which are electrically connected to the central controller 313 are as follows: the user interface systems 203, the robot video camera 315, the pharmacist video camera 317, the pharmacist's workstation computers 311, and the robot system controller 503. Additionally, system 201 includes one or more uninterruptible power supplies 501 which connect to the central controller 313 and user interface device 203 to provide battery backup in the event of a power loss. It is contemplated that the central controller 313 could be remotely monitored through an external network to frequently check the system health, infrastructure, performance data, etc. The central Controller 313's external server will be located in the HIPAA certified Cloud. No private customer data will be stored on the local server or in the hard drives of the workstations 311.

Figure 6:
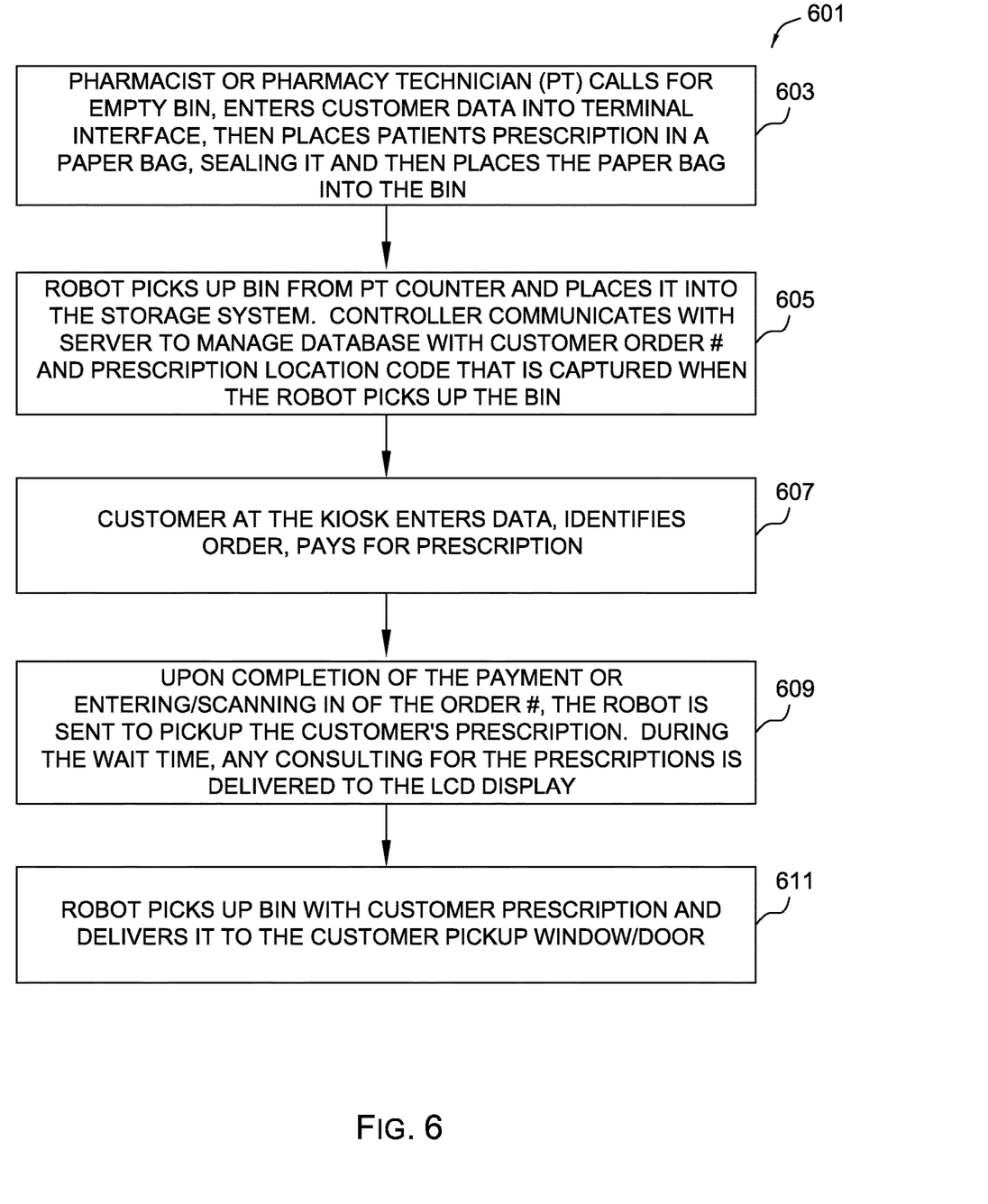
FIG. 6 is a flow chart of the method of use of the automated pharmacy system of FIG. 2.

Referring now to FIG. 6, a flow chart describing the method of operation of the automated pharmacy system 201 is given. First, the pharmacist calls for an empty bin and the robot picks a bin from the storage rack. Then, the pharmacist or pharmacy technician prepares the order and places it into the bin, as depicted in box 603. Next, the robot places the bin in the storage rack system and the controller electronically notates where the order is stored, as depicted in box 605. Next, the customer at the kiosk enters their data, identifies their order, and pays for the prescription medication, as depicted in box 607. Next, the robot is sent to pick up the appropriate bin containing the prescription medication. Finally, the robot delivers the prescription medication to the delivery chute, as depicted in box 611.

Figure 7:
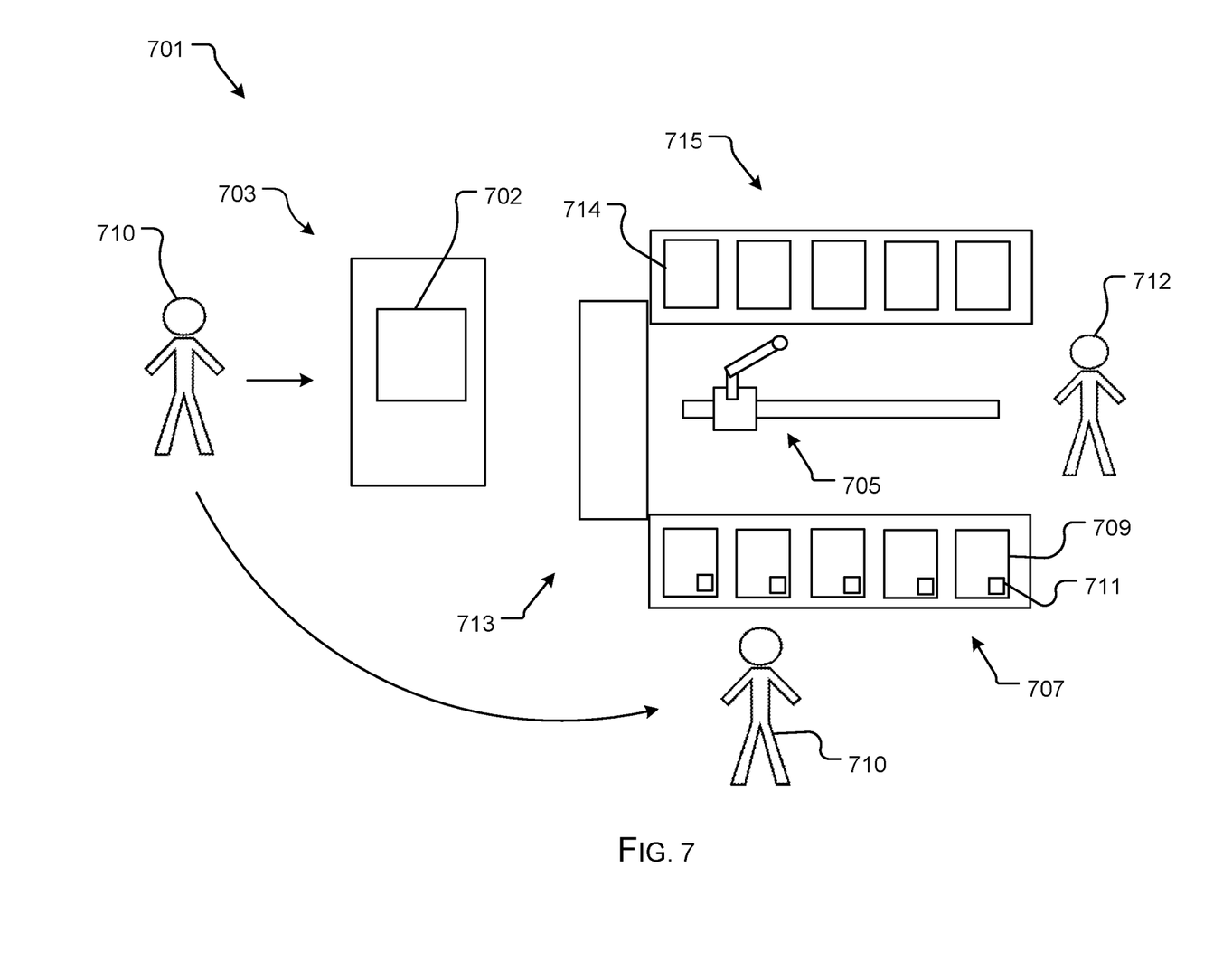
FIG. 7 is a simplified schematic of an automated pharmacy system in accordance with an alternative embodiment of the present application.

In FIG. 7, a simplified schematic demonstrates an alternative embodiment of an automated pharmacy delivery system 701 in accordance with the present application is shown. This system is similar in form and function to system 201, and includes a kiosk 703 having an interface 702 with a touch screen to receive customer information. System 701 in addition, includes a robot 705, similar in form and function to previously described robot 301, and a locker unit 707 having a plurality of lockers 709 with an identification reader 711. It should be appreciated that the identification reader 711 could be a card reader, a key pad configured to receive a code, a scanner, or any other means through which a customer can be identified.

It should further be appreciated that each locker can have a back door, through which the pre-packaged medication is placed, the back door area providing a barcode (or similar device) to be read by a scanner of the robot. In addition, each locker can have a front door through which the pre-packaged medication is retrieved by the customer 710 based on the correct identification being presented, the correct identification causing the locker to unlock.

In addition, system 701 can include an inventory unit 713, wherein medications are stored prior to preparation by a pharmacist 712, and a storage unit 715, wherein prepared medications are stored prior to pick up by a customer in one or more bins 714. It should be understood that the teachings throughout this application, in reference to system 201, should be considered incorporated herein as necessary.

Figure 8:
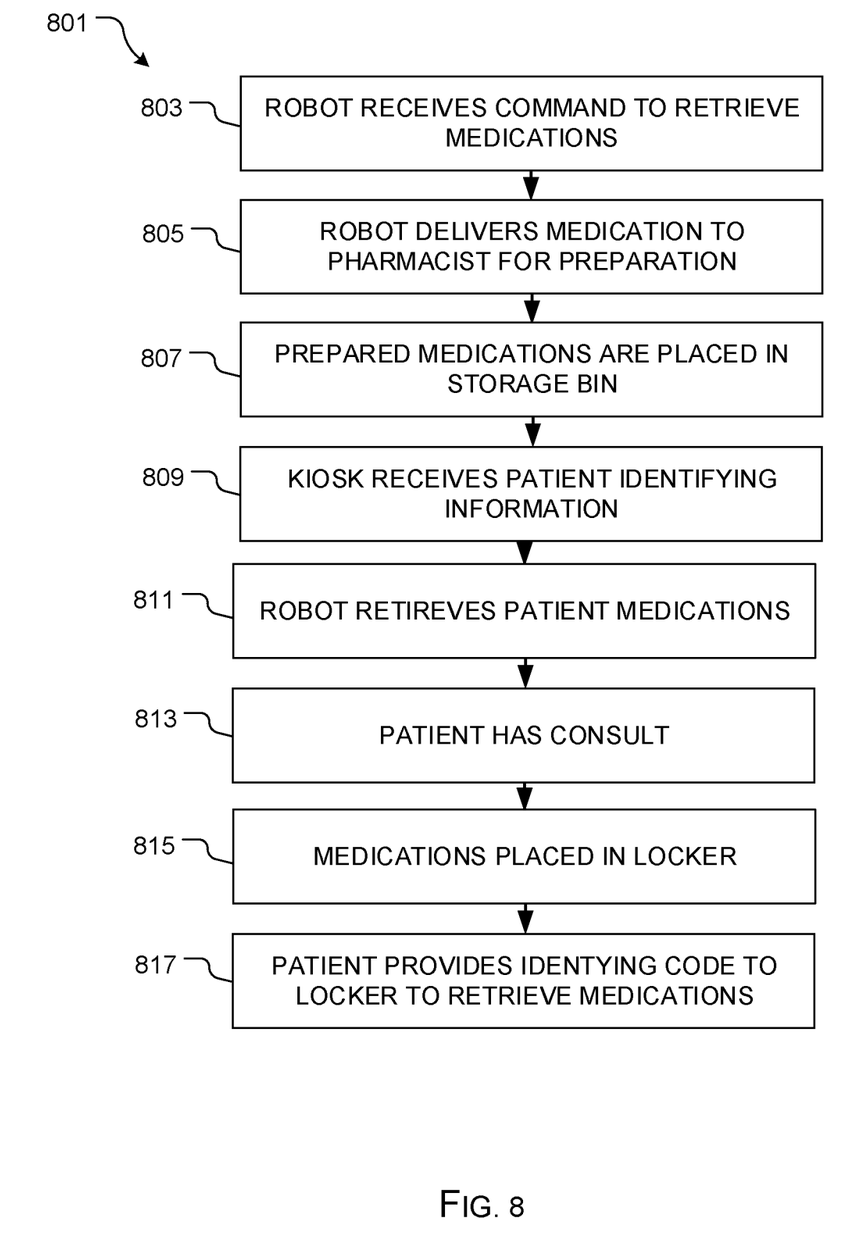
FIG. 8 is a flowchart of the method of use of the system of FIG. 7.

In FIG. 8, a flowchart 801 depicts a method of use of system 701. During use, robot 705 receives instructions from a central control unit to retrieve medications necessary for particular patient's prescription preparation from the inventory unit, as shown with box 803. The robot retrieves the medication items from the inventory unit and delivers the items to a pharmacist or pharmacist technician, as shown with box 805. Once the pharmacist prepares the medication package, the robot places the package in the storage bin, as shown with box 807. The kiosk receives patient identifying information through an interface, as shown with box 809, which signals the robot to collect the corresponding pre-prepared medications, as shown with box 811. While the robot is collecting the package, the customer can have a consultation with the pharmacists, as shown with box 813. During this time, the customer's pre-prepared medication package is placed in a designated locker, wherein the customer can retrieve the package with the identifying information, as shown with boxes 815, 817. It should be appreciated that the kiosk will either provide identifying information, such as a code, or the kiosk will provide instructions to the customer regarding the identifying information, such as letting the customer know to use their government ID, or the like.

It should be appreciated that system 701 is similar in form and function to system 201, with the removal of the more complex prescription deliver device described above. This alternative embodiment can provide a less complex, and therefore more economically available alternative to the delivery system of 201.

It should be appreciated that the robot 705 can include all necessary components, such as scanners, cameras, arms, etc. In addition, the kiosk 703 can include features such as the ability to accept payment, to provide prescription information, and to store and record customer information.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An automated pharmacy system, comprising:
   a storage rack;
   a plurality of compartmentalized shelves secured within the storage rack, the plurality of compartmentalized shelves being accessible from a back area of the storage rack and being blocked from access from a front of the storage rack;
   a plurality of bins stored within the plurality of compartmentalized shelves within the storage rack and configured to store one or more medication packages therein, the one or more medication packages pre-prepared by a pharmacy technician, and each bin of the plurality of bins having a separate bar code;
   a prescription delivery device, having:
      an interface device having a touch screen manually manipulated by a user, the interface located at the front of the storage rack;
      a first camera in data communication with the interface and configured to record an identity of the user;
      a delivery shoot extending from the back of the storage rack to the front of the storage rack, the delivery shoot configured to transport one of the plurality of bins from the back of the storage rack to the front of the storage rack and to the user; and
      a card reader configured to receive a payment from the user;
   a central computer in data communication with the prescription delivery device;
   a robotic arm manipulated by the central computer, the robotic arm being configured to grab the one of the plurality of bins from the back of the storage rack and deliver the one of the plurality of bins to the delivery shoot;
   a rail positioned on a ground surface and configured to provide transverse means for the robotic arm to move relative to the plurality of bins;
   a bar code reader secured to the robotic arm, the bar code reader being configured to read the bar codes associated with each bin of the plurality of bins; and
   a second camera in data communication with the central computer and positioned to receive a consultation from a pharmacy personnel;
   wherein the robotic arm does not come into contact with medications;
   wherein the consultation is delivered to the user via the interface;
   wherein the user commands movement of the robotic arm via the interface device; and
   wherein the robotic arm is configured to retrieve one or more bins as instructed from the interface device.

* * * * *